US006564653B2

(12) United States Patent
Desbiolles

(10) Patent No.: US 6,564,653 B2
(45) Date of Patent: May 20, 2003

(54) DEVICE FOR MEASURING TORQUE APPLIED TO A TURNING SHAFT

(75) Inventor: Pascal Desbiolles, Glieres (FR)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/966,196

(22) Filed: Sep. 28, 2001

(65) Prior Publication Data

US 2002/0050178 A1 May 2, 2002

(30) Foreign Application Priority Data

Oct. 31, 2000 (FR) .............................. 00 14014

(51) Int. Cl.[7] ................................................ G01L 3/02
(52) U.S. Cl. ............................................. 73/862.335
(58) Field of Search ................. 73/862.328, 862.331, 73/862.332, 862.333, 862.334, 862.335, 862.336

(56) References Cited

U.S. PATENT DOCUMENTS 4,450,729 A    5/1984  Troeder et al.
4,478,082 A  * 10/1984  Sato et al. ...................... 73/593
4,533,902 A  *  8/1985  Baker et al. ............. 324/207.25
4,660,021 A  *  4/1987  Leiby .......................... 341/11
5,018,393 A     5/1991  Seegers

FOREIGN PATENT DOCUMENTS

FR         2769087        9/1997
FR         2769088        9/1997

* cited by examiner

*Primary Examiner*—Max Noori
(74) *Attorney, Agent, or Firm*—Michael Best & Friedrich LLP

(57) ABSTRACT

A test body deformable upon application of torque to a turning shaft. First and second bearings with the turning collar of the first bearing being connected near a first end of the test body and the turning collar of the second bearing being connected near a second end of the test body. Each bearing is equipped with a digital device for determining the angular position of the turning collar relative to the fixed collar. Each digital device includes an annular device for generating magnetic pulses, mounted for turning jointly with the turning collar, and a fixed magnetic sensor for detecting the magnetic pulses and for delivering digital signals. An electronic device processes digital signals from the magnetic sensors to determine the angular position of the annular devices, and a comparison device compares the digital signals to ascertain the torque applied to the turning shaft.

17 Claims, 3 Drawing Sheets

DEVICE FOR MEASURING TORQUE APPLIED TO A TURNING SHAFT

BACKGROUND OF THE INVENTION

Figure 1:
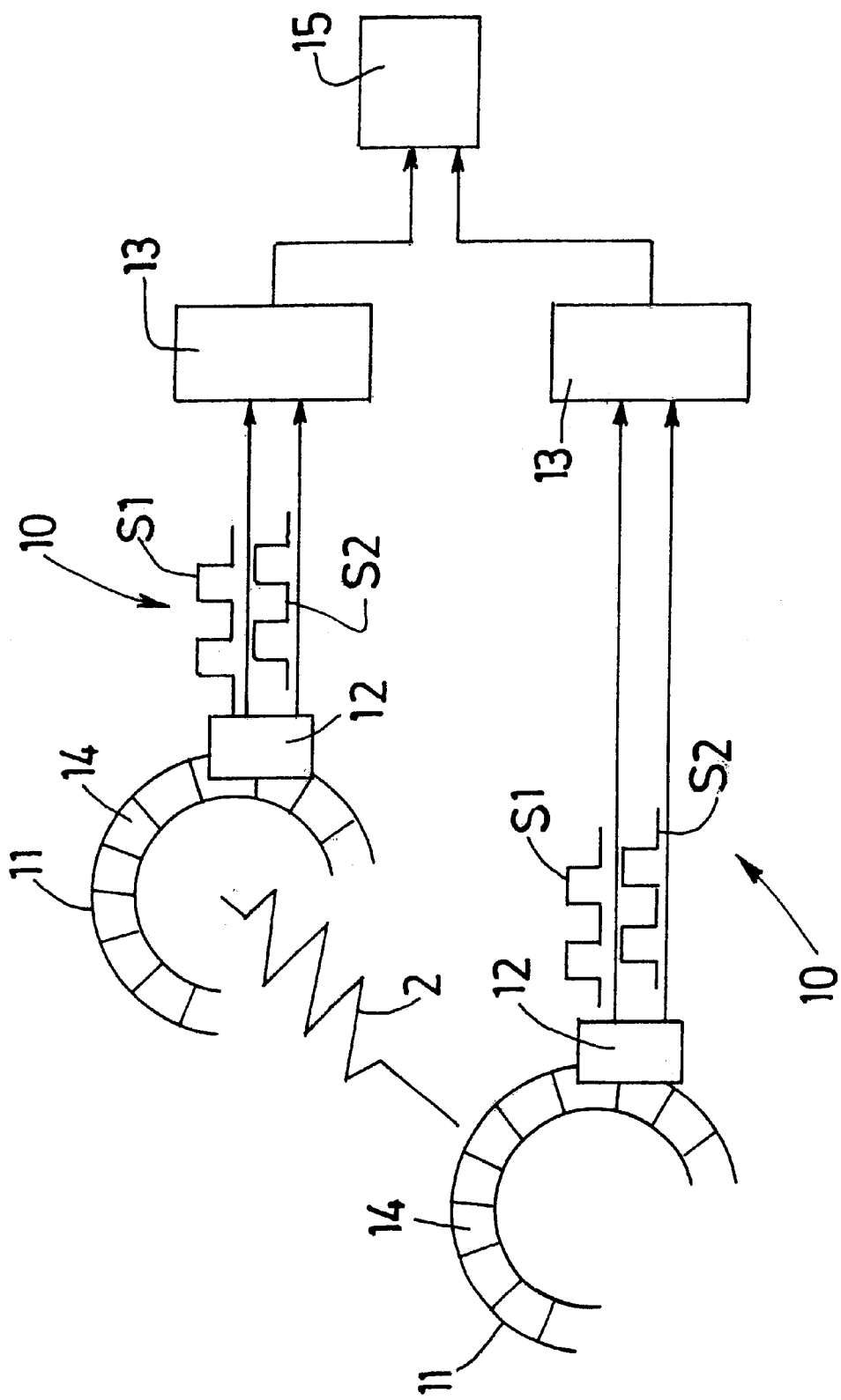

This invention relates generally to devices for measuring torque applied to a turning shaft and, more particularly, to devices for measuring torque applied to a steering column of a vehicle through a steering wheel.

Conventionally, a steering column is designed as a tubular element, fixed to the body of a vehicle under the instrument panel, that guides and supports a transmission shaft connected to the steering wheel. The steering wheel is then a manual control component, connected to the steered wheels and used by the driver for steering the vehicle.

The invention also concerns decoupled steering columns. In contrast to conventional steering columns, decoupled steering columns are not connected with a steering box transforming the circular movement of the steering wheel into angular displacement of the drop arm, that causes steering of the wheels. Quite the reverse, with decoupled steering there is no direct mechanical connection between the steering wheel and the wheels resting on the ground, whether the vehicle is real or belongs to a simulation system. This simulation can have the goal of games, in connection with training in automobile driving schools or even in connection with an interactive driving simulation for the needs of automobile manufacturers.

In such simulators, the interpretation of force at the steering wheel as a result of a mechanism generating a resisting torque on the steering wheel according to the type of vehicle to be simulated, which may or may not be equipped with power-assisted steering, must take into account the conditions to be recreated. The measurement of the torque applied to the steering wheel is consequently essential for ensuring good simulation in real time.

The measurement of the torque on the shaft of the steering wheel is also very important in power steering or power-assisted steering. In fact, the triggering of the assistance particularly depends on the torque applied to the steering wheel by the driver. The device for measuring the torque used in power steering produces a signal indicative of steering torque exerted by the driver on the steering wheel, and therefore on the transmission shaft of the steering column of the vehicle. This signal is conventionally addressed at a steering assistance computer that triggers the assistance by controlling, for example, an electric motor, in the case of electric power steering.

Measuring devices of the torque applied to the turning shaft are already known, and consist of a torsion bar in which an output signal is the analog type that is proportional to the magnetic field. For example, the detection of the angular displacement of two magnetic field generators in relation to detecting devices makes it possible to deliver an analog signal proportional to the torque applied. This type of analog magnetic technology has a number of drawbacks, in particular regarding the control of the air gap and the temperature balance of the magnetic field.

Within the scope of torque measuring devices of the prior art, the control of the air gap and drifts in temperature complicate the assembly because of the number of mechanical parts to be assembled and the precise placement of the magnetic transitions in relation to the detecting devices, which requires a phase for calibrating and regulating during assembly of the device. Furthermore, torque measuring devices of the prior art do not integrate bearings necessary for rotation of the turning shaft, which make the shaft and torque measuring device more complex to assemble.

The foregoing illustrates limitations known to exist in present devices and methods. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the invention, this is accomplished by providing a device for measuring torque applied to a turning shaft, the device comprising a test body that is deformable with torsion upon application of torque to the shaft and first and second bearings. Each bearing has a fixed collar, a turning collar, and rolling bodies arranged between them, the turning collar of the first bearing being connected with the test body near a first end of the test body, the turning collar of the second bearing being connected with the test body near a second end of the test body. The first and second bearings each are equipped with a digital device for determining angular position of the turning collar in relation to the fixed collar, with the digital devices including an annular means for generating magnetic pulses, mounted for turning jointly with the turning collar, and a fixed magnetic sensor for detecting the magnetic pulses and for delivering digital signals. An electronic means for processing digital signals from the magnetic sensors to determine the angular position of the annular means. A comparison device compares digital signals derived, respectively, from each of the electronic means to ascertain the torque applied to the turning shaft.

According to a second aspect of the invention, this is accomplished by providing a module for measuring torque applied to a turning shaft, with the module consisting of a device such as that described above and a means of connecting the module with, respectively, two parts of the turning shaft, with the turning shaft lacking a test body.

According to a third aspect of the invention, this is accomplished by providing a module for measuring torque applied to a turning shaft, with the module comprising a device such as that described above and a means of connecting the module with, respectively, one end of the turning shaft and the component applying the torque, with the turning shaft lacking a test body.

The foregoing and other aspects will become apparent from the following detailed description of the invention when considered in conjunction with the accompanying

BRIEF DESCRIPTION OF THE DRAWING FIGURES

Figure 2:
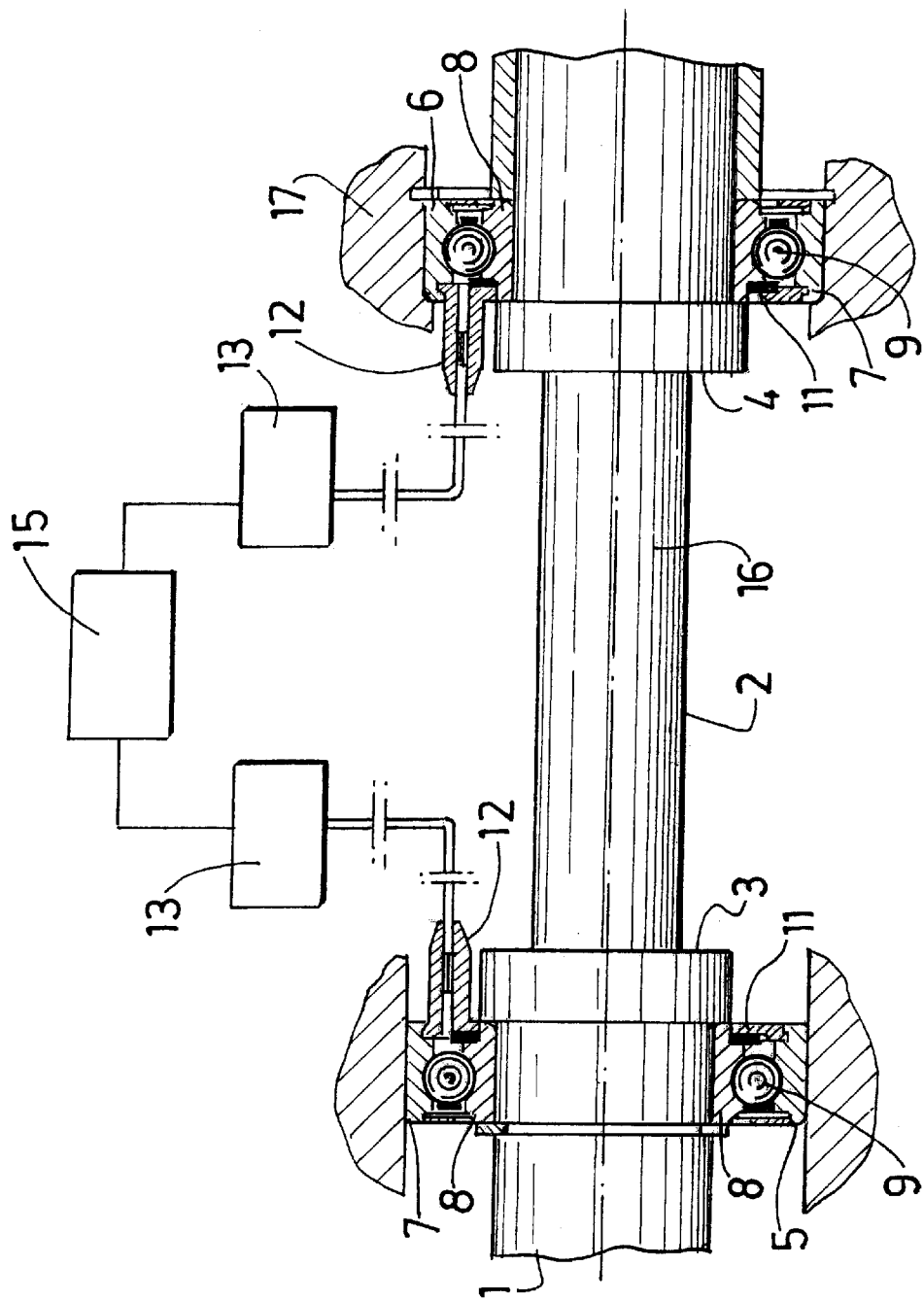
Figure 3:
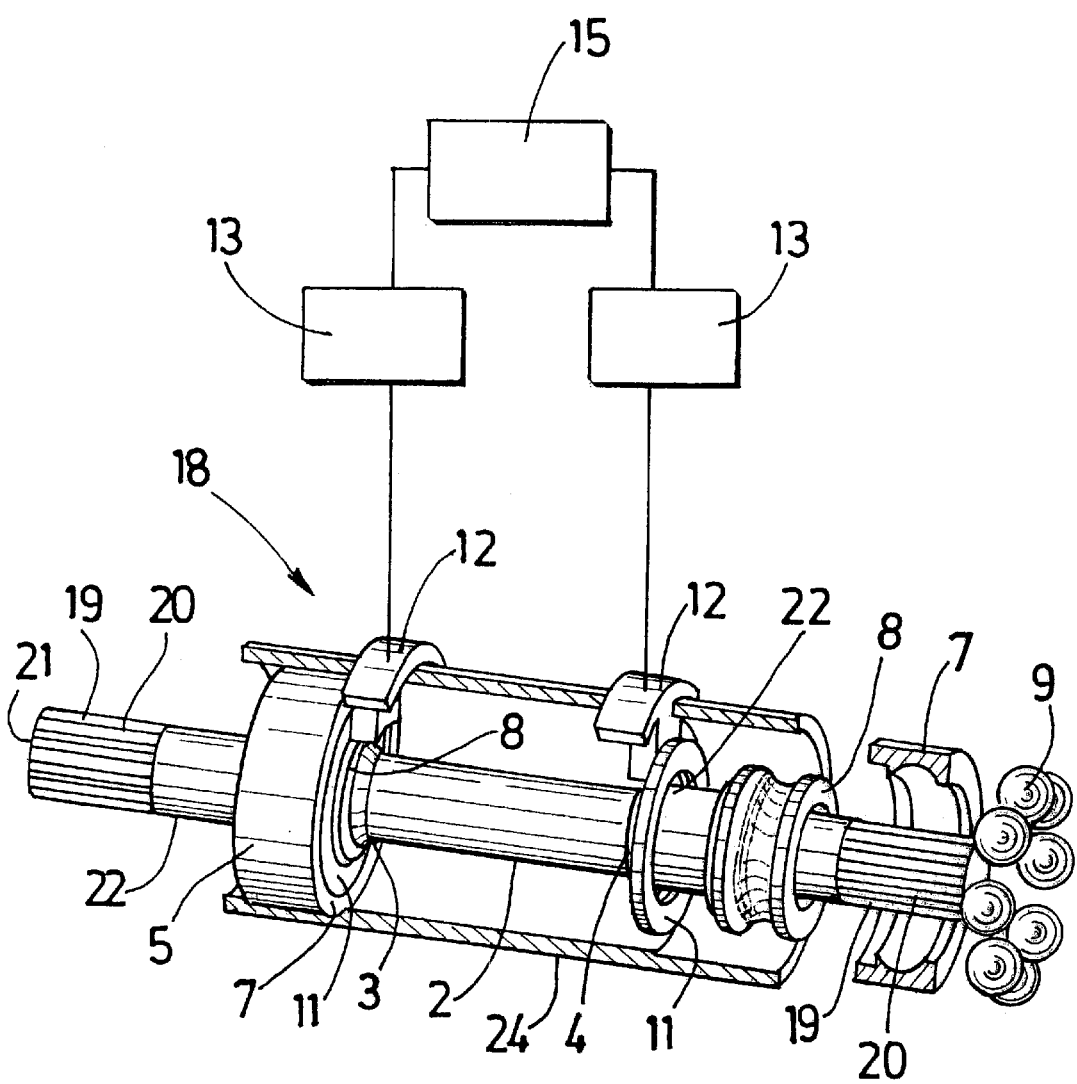

FIG. 1 is a functional diagram of a measuring device of the torque applied to a turning shaft showing the two multipole rings connected respectively with a turning collar of a bearing; the two fixed magnetic sensors each deliver two signals that are treated respectively by an electronic means so as to determine the angular position of each of the two multipole rings, with the comparison device delivering the value of the torque applied to the turning shaft;

FIG. 2 is a partial view in longitudinal section of a steering column integrating a device for measuring torque applied to the steering column; and FIG. 3 is a perspective view, partially exploded and partially torn away, of a module for measuring torque applied to a turning shaft.

DETAILED DESCRIPTION

FIGS. 1 through 3 represent a measuring device of torque applied to a turning shaft 1 of the type consisting of a test body 2 that is deformable with torsion under the action of the torque applied to shaft 1. In a specific example (see FIG. 2), the turning shaft 1 is a steering column of a vehicle on which steering torque is exerted by the driver with the aid of the steering wheel.

To determine this steering torque, it is known that a test body 2 may be provided that is capable of transmitting applied torque by being elastically deformed under the action of the torque. The measurement of the torque exerted can then be processed, particularly in the form of an electric signal, with a steering assistance computer that triggers the assistance, for example, through an electric motor in the case of electric power steering.

The test body 2 is typically presented in the form of a torsion bar with reduced diameter in relation to that of the shaft 1 because, with isotropic linear elasticity, the torque exerted in pure torsion on a complete cylindrical bar with a circular cross section varies for a given material, according to the fourth power of the diameter of the bar with a fixed torsion angle. Consequently, the fact of forming a zone with a reduced cross section, under the effect of the torque applied, makes it possible to concentrate and amplify the deformations in torsion on said zone so as to form from it a preferred zone for the value of the torque.

In the embodiment methods represented in the figures, the torsion bar 2, arranged coaxially with the shaft 1, is cylindrical in cross section. However, to facilitate particular applications, the arrangement of the torsion bar 2 and/or the geometry of the cross section can be provided differently. The test body 2 presents a first 3 and a second 4 end that, under the effect of the torque applied to the shaft 1, are displaced by rotating jointly with the shaft 1, but with an angular displacement of one compared with the other.

It is desired to measure this angular displacement in order to calculate the torque applied to the shaft 1 by electronic means, taking into account the nature of the test body. For this purpose, a first 5 and second 6 bearing are provided, respectively, near the first 3 and the second 4 ends of the test body 2 and opposite each other. These bearings 5, 6 are those usually used to enable rotation of a turning shaft 1; namely, they are of the type consisting of a fixed exterior collar 7, a turning interior collar 8, and rolling bodies 9 arranged between them.

According to the invention, the bearings 5, 6 are each equipped with a device 10 that determines the angular position of the turning collar 8 in relation to the fixed collar 7. In the embodiments represented in FIGS. 2 and 3, the bearings 5, 6 are identical and are arranged opposite each other; however, different bearings 5, 6 can be supplied, provided that they are constructed to enable the measurement of the angular position of the turning collar 8, and therefore that of the end 3, 4 of the test body 2 with which it is connected.

In relation to FIG. 1, digital determination devices 10 are described, each consisting of an annular means 11 generating magnetic pulses combined with the turning collar 8 to turn jointly with it; a magnetic sensor 12 fixed in relation to the turning shaft 1, and which is constructed to detect said magnetic pulses and to deliver digital signals S1, S2; and electronic means 13 capable of determining the angular position of the annular means 11 from the digital signals derived from said magnetic sensor 12. Such devices 10 are, for example, described in documents FR-A-2,769,087 and FR-A-2,769,088 from the applicant, and, accordingly, descriptions will not be repeated here.

Sensors 12 consist of, for example, at least two sensing elements or a block of sensing elements chosen from the group consisting of Hall-effect probes, magnetoresistances elements and, giant magnetoresistances elements, with sensing elements being placed opposite the air gap of the annular means 11 generating magnetic pulses. In a specific example, the means 11 for generating pulses is formed from a multipole ring of synthetic material loaded with particles of ferrite formed with several contiguous fields 14 with inverted direction of magnetization of a given field by comparison with the two fields that are contiguous with it.

According to this embodiment, the sensors 12 produce at least two electric signals that are sinusoidal in form, of the same amplitude, centered on the same average value, and in quadrature with each other. Furthermore, they have a period equal to one rotating turn of the ring, or $2\pi$ mechanics. From these signals, and as described respectively in the documents FR-A-2,769,087 and FR-A-2,769,088, it is possible to obtain digital signals S1 and S2 that make it possible, through electronic means 13, to determine the relative or absolute position of the ring 11, and therefore the connected turning collar 8, in relation to the fixed collar 7.

Relative angular position of a turning component is understood to be the angle separating the position of the turning component, at any given moment, from any initial position of the latter in relation to the fixed structure. This initial position can vary from one measurement to another in relation to the fixed structure. Absolute angular position is understood to be the angle separating the position of the turning component at any given moment, from a reference position of the turning component, with this reference position being fixed in relation to the fixed structure.

As a variant, the determination devices 10 can each consist of an interpolator increasing the resolution of the respective output signals, such as described in the document FR-A-2,769,087. According to one embodiment, one of the determination devices 10 can also be used to determine the angular position of the turning shaft 1. The value of this position, especially when it is absolute, can then be used, alone or in combination with the measurement of the applied torque, in a safety system of the vehicle, such as a traction control system, antilock brake system, roll control system, or even a navigation support system.

Moreover, a comparison device 15 of signals derived respectively from electronic means 13 of each of the determination devices 10 is provided to ascertain the value of the torque applied to the turning shaft 1. The device for measuring the torque thus makes it possible, using the analog signals representing the variation in the electric field, to generate digital signals S1, S2, that are next treated in digital form by electronic means 13, then by the comparison device 15 to obtain the value of the torque applied. According to the type of sensor 12 used, the device 15 is constructed to compare either two relative angles or two absolute angles.

In one embodiment example, the determination devices 10 each consist of a register initialized at zero under zero torque, and the comparison device 15 consists of a subtracter of the value of each of the registers so as to ascertain, according to the nature of the test body, the value of the torque applied to the turning shaft 1. The electronic means and the comparison device can be integrated into a control computer of at least one function of a car, for example, electric power-assisted steering or path control.

In the embodiment represented in FIG. 2, the test body 2 is integrated with a steering column 1 in the form of a zone 16 with reduced diameter originating from material of column 1. The turning collars 8 of the bearings 5, 6 are each fixed on one part of column 1 near the first 3 and the second 4 end of the test body 2, respectively. The steering column 1 is connected on the one hand with the steering wheel and, on the other hand, with the steering box, for example, a rack transforming the circular movement of the steering wheel into angular displacement of the drop arm, which causes steering of the wheels. The fixed collars 7 of the bearings 5, 6 are connected with a fixed structure, for example, a hollow tube 17, in which column 1 is arranged for turning.

In the embodiment method represented in FIG. 2, only the fixed collar 7 of the bearing 6 is connected with tube 17. The fixed collar 7 of the bearing 5 is assembled so that it slides in said tube 17. In this embodiment, the whole unit formed from the turning collars 8 and the column 1 is therefore assembled so that it turns within fixed tube 17. Moreover, the sensor 12 is connected with the fixed collar 7 of each of the bearings 5, 6, opposite and away from the air gap of the multipole ring 11, so that the sensors 12 are respectively integrated with said bearings 5, 6.

When torque is applied to the steering column 1 through the steering wheel, the latter transmits the torque to the steering box by turning at a certain angle. The test body 2, particularly due to its geometry and/or the nature of the material of which it is composed, is constructed to transmit the movement of rotation while undergoing elastic torsion under the action of torque. The result of this torsion is that the ends 3, 4 of the test body 2, and therefore of the turning collars 8 connected with them, move by rotating jointly with column 1 but with an angular displacement of one with the other, with said displacement increasing proportionally with the intensity of the torque.

The geometry and/or nature of the material composing the test body 2 are provided so that, on the entire normal zone of use of the steering column 1, on the one hand the torsion does not exceed the elastic limit of the material and, on the other hand, the angular displacement is detectable by the determination devices 10 used. The sensors 12, by measuring the angular position of each of the turning collars 8, make it possible to obtain the value of the torque with these two positions, in particular from the difference between these two values in the zone of elastic torsion of the test body 2.

In addition, the measurement of one or both sensors 12 can be used to determine the relative or absolute position of the column 1 in relation to the frame of the vehicle. In fact, the angular position of one of the turning collars 8 corresponds to that of the column 1, namely typically between −4π and +4π in the case or [sic; where] the steering wheel is expected to make 4 complete turns.

FIG. 3 represents a module 18 for measuring torque applied to a turning shaft 1, with the module 18 consisting of a torque measuring device such as that described above. In this figure, one of the bearings 6 is represented in an exploded view so as to better show the fixed collar 7, the multipole ring 11, the turning collar 8, and the rolling bodies 9. The module 18 is designed to be inserted, possibly immovably, between two parts of a unit to which the torque to be measured is applied. For this purpose, the module 18 consists of, to the torque measuring device, a means of connection 19 of said module 18 with this unit.

According to a first variant, module 18 is integrated between two parts of the steering column 1, with said column lacking the test body. According to a second variant, module 18 is integrated between the steering column 1 and the steering wheel, with the column lacking a test body.

The means of connection 19 represented in FIG. 3, two in number, are each formed from a grooved part 20, each extending from one of two sides of the module 18. For example (see FIG. 3), the grooved parts 20 are provided on one end 21 of a cylindrical part 22 with a diameter approximately identical to that of the column 1 and the other end 23 which originated from material with the test body 2. According to this embodiment, the unit formed from the test body 2 and the connection means 19 is a monobloc casting. The part of the column and/or the component applying the torque can be made integral with these two grooved parts 20, respectively, particularly by force fit, so that the unit thus formed is capable on the one hand of transmitting the torque and, on the other hand, of measuring it.

In the module represented in FIG. 3, the turning collar 8 of each bearing 5, 6 is connected with the test body 2 near its respective ends 3, 4. Module 18 also consists of a hollow tubular part 24 (represented partially in FIG. 3) with which the fixed collars 7 of the bearings 5, 6 are connected. The sensors 12 are also connected with this part 24 in order to be separate from the bearings 5, 6. Such a module 18 has the advantage of being compact and of forming an independent unit that may be connected, possibly immovably, with a unit to which a torque is applied before being transmitted and measured.

The invention can also be applied to other areas, such as for the transmission of force, for example, for the wheels of a vehicle, and for the control of braking of the vehicle by means of the measurement of the applied torque. In fact, the digital sensors operate with comparators with thresholds and, because of this, are less sensitive than the analog sensors of the prior art to variations in amplitude of the magnetic field. Furthermore, in order to increase the resolution of the output digital signals, these magnetic sensors can include a spatial digital interpolator of the ratiometric type, making it possible to be free of variations in air gap and drifts of temperature amplitude.

In addition, the invention provides a torque measuring device in which the magnetic sensors remain fixed during rotation of the turning shaft. Furthermore, according to the invention, the measurement function for torque is integrated with two bearings of the turning shaft using technology of the multipole encoder type so as to add the function of guiding while rotating shaft in addition to measuring the torque. This integration simplifies assembly.

Having described the invention, what is claimed is:

1. A device for measuring torque applied to a turning shaft, the device comprising:

a test body that is deformable with torsion upon application of torque to the shaft;

first and second bearings, each bearing having a fixed collar, a turning collar, and rolling bodies arranged between them, the turning collar of the first bearing being connected with the test body near a first end of the test body, the turning collar of the second bearing being connected with the test body near a second end of the test body;

the first and second bearings each being equipped with a digital device for determining angular position of the turning collar in relation to the fixed collar, with the digital devices including an annular means for generating magnetic pulses, mounted for turning jointly with the turning collar, and a fixed magnetic sensor for detecting the magnetic pulses and for delivering digital signals;

electronic means for processing digital signals from the magnetic sensors, capable of determining the angular position of the annular means; and a comparison device for comparing digital signals derived, respectively, from each of the electronic means for ascertaining the value of the torque applied to the turning shaft.

2. The device according to claim 1, wherein the sensors comprise at least two sensing elements chosen from the group of Hall-effect probes, magnetoresistance elements, and giant magnetoresistances elements.

3. A device according to claim 1, wherein the annular means that generates pulses is a multipole ring of synthetic material loaded with particles of ferrite formed with several contiguous magnetic fields with inverted direction of magnetization of a given magnetic field in relation to two contiguous magnetic fields.

4. A device according to claim 1, wherein the comparison device compares two relative angles.

5. A device according to claim 1, wherein the comparison device compares two absolute angles.

6. A device according to claim 1, wherein at least one of the determination devices is also used for determining angular position of the turning shaft.

7. A device according to claim 6, wherein at least one of the determination devices ascertains absolute position of the turning collar in relation to the fixed collar.

8. A device according to claim 1, wherein the determination devices each comprise an interpolator that increases resolution of respective output signals.

9. A device according to claim 1, wherein the determination devices each comprise a register that is initialized at zero under zero torque.

10. A device according to claim 9, wherein the comparison device comprises a subtracter for subtracting a value of the registers to ascertain the torque applied to the turning shaft.

11. A device according to claim 1, wherein the electronic means and the comparison device are integrated in a control computer.

12. A device according to claim 1, wherein the test body is integrated with the turning shaft, the test body being in the form of a zone of reduced diameter originating from material of the turning shaft.

13. A device according to claim 1, wherein the fixed magnetic sensor is integrated with the first and second bearings.

14. A module for measuring torque applied to a turning shaft, the module comprising:

a test body that is deformable with torsion upon application of torque to the shaft;

first and second bearings, each bearing having a fixed collar, a turning collar, and rolling bodies arranged between them, the turning collar of the first bearing being connected with the test body near a first end of the test body, the turning collar of the second bearing being connected with the test body near a second end of the test body;

the first and second bearings each being equipped with a digital device for determining angular position of the turning collar in relation to the fixed collar, with the digital devices including an annular means for generating magnetic pulses, mounted for turning jointly with the turning collar, and a fixed magnetic sensor for detecting the magnetic pulses and for delivering digital signals;

electronic means for processing digital signals from the magnetic sensors, capable of determining the angular position of the annular means;

a comparison device for comparing digital signals derived, respectively, from each of the electronic means for ascertaining the value of the torque applied to the turning shaft; and means of connection with, respectively, two parts of the turning shaft, with the turning shaft lacking the test body.

15. A module for measuring torque applied to a turning shaft, the module comprising:

a test body that is deformable with torsion upon application of torque to the shaft;

first and second bearings, each bearing having a fixed collar, a turning collar, and rolling bodies arranged between them, the turning collar of the first bearing being connected with the test body near a first end of the test body, the turning collar of the second bearing being connected with the test body near a second end of the test body;

the first and second bearings each being equipped with a digital device for determining angular position of the turning collar in relation to the fixed collar, with the digital devices including an annular means for generating magnetic pulses, mounted for turning jointly with the turning collar, and a fixed magnetic sensor for detecting the magnetic pulses and for delivering digital signals;

electronic means for processing digital signals from the magnetic sensors, capable of determining the angular position of the annular means;

a comparison device for comparing digital signals derived, respectively, from each of the electronic means for ascertaining the value of the torque applied to the turning shaft; and means of connection with one end of the turning shaft and with a component applying the torque, with the turning shaft lacking the test body.

16. A measuring module according to claim 14, wherein the magnetic sensors are separate from the first and second bearings.

17. A measuring module according to claim 15, wherein the magnetic sensors are separate from the first and second bearings.

* * * * *